April 28, 1931. E. J. W. RAGSDALE ET AL 1,802,957
CURRENT COLLECTOR
Filed March 29, 1928
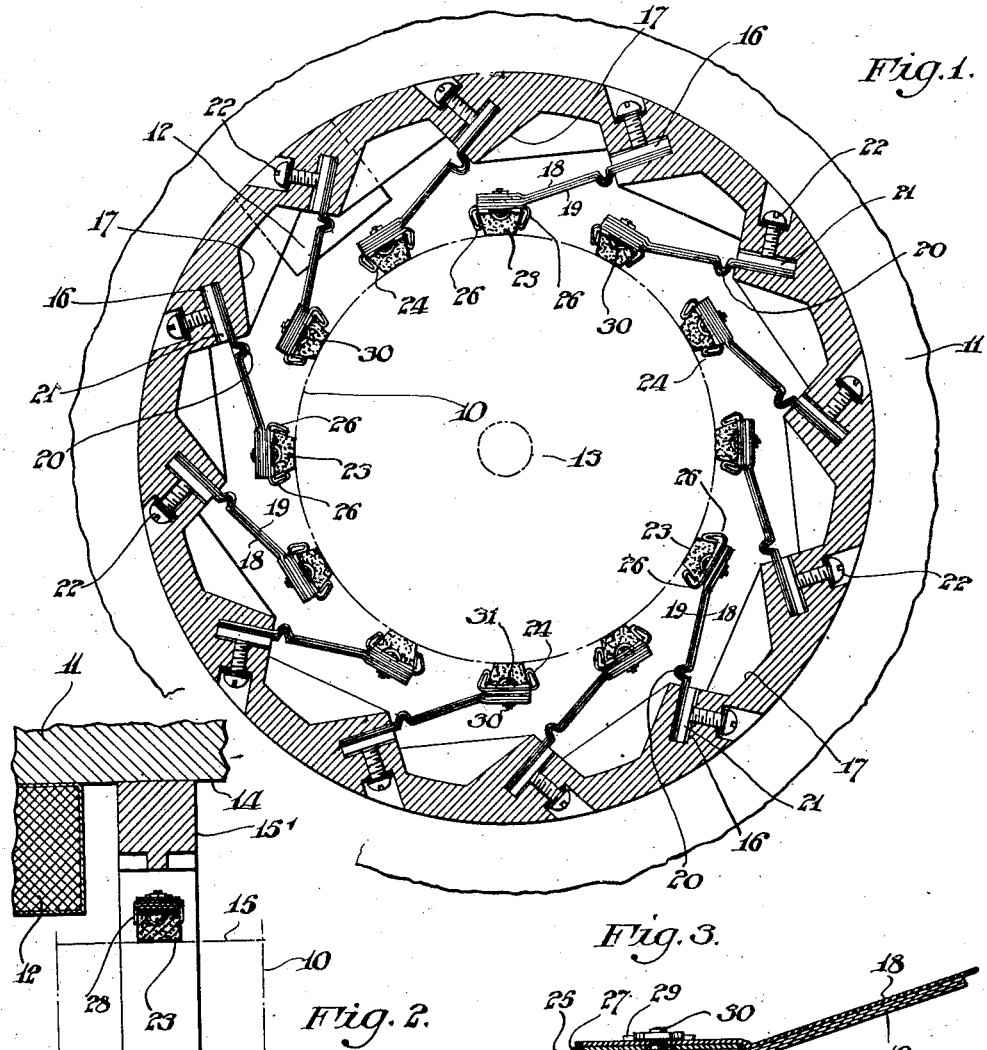
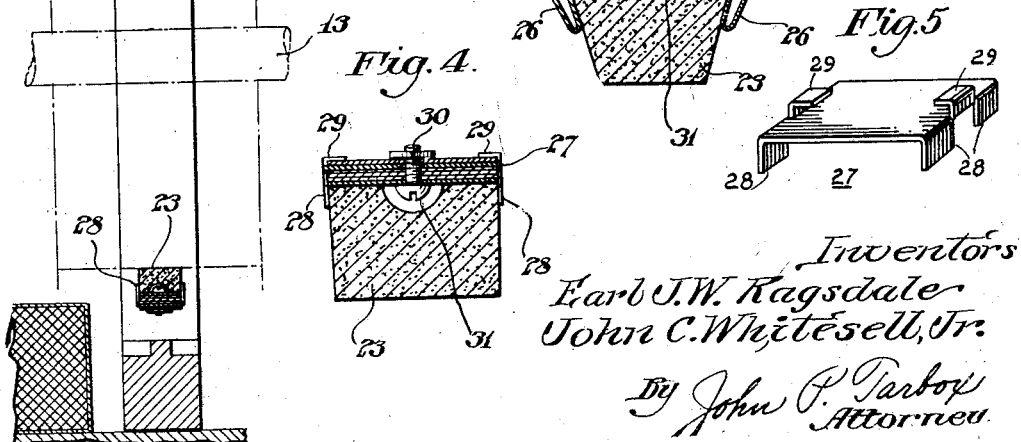
Inventors
Earl J. W. Ragsdale
John C. Whitesell, Jr.
By John P. Tarbox
Attorney Patented Apr. 28, 1931

1,802,957

UNITED STATES PATENT OFFICE

EARL J. W. RAGSDALE AND JOHN C. WHITESELL, JR., OF NORRISTOWN, PENNSYLVANIA, ASSIGNORS TO EDWARD G. BUDD MANUFACTURING COMPANY, OF PHILADELPHIA, PENNSYLVANIA, A CORPORATION OF PENNSYLVANIA

CURRENT COLLECTOR

Application filed March 29, 1928. Serial No. 265,581.

The prime object of this current collector is the attainment of a construction which may be utilized with the highest current collecting efficiency in connection with those dynamo electric machines in which the volume of current is extreme and the voltage of the current is relative low. Homopolar machines constitute the principal field for such a current collector, but there are other fields and it may be that there are fields where the conditions are somewhat different yet similar in some respects. For example, my invention should be useful in some at least of the fields where the extreme volume of the current is the principal controlling factor. So too, my invention may be used in some fields where there is but a moderate amount of current to be collected but the conditions of mechanical and electrical efficiency are very exacting.

But it has long been known that one of the greatest drawbacks to the homopolar machine has been the inefficiency of current collection. With the extreme current volumes found in those machines the ohmic loss has been extremely high. In most such machines it has been impracticable to use more than a very low voltage.

The ohmic loss in current collectors of such machines has been highest at the junction points, first, at the junction between the rotor of the collector and the brush or its equivalent; second, in the connection between the brush and its leads; and third, in the connection between the leads and the fixed conducting body next in series. Commonly exploited means of lessening these losses have been in increased brush pressure, intimate connections between brush and lead and lead and fixed conductor, such for example, as electro-plating connections, autogenous joinder and the like, and the utilization of mountings and connections of massive form and/or large cross section. These expedients, while they have proven electrically effective, have proven mechanically very cumbersome and inefficient. Adjustment can be had with difficulty only, is inadequate where it can be had, mechanical losses are high and there is undue wear.

It is a prime object of our invention to reduce the ohmic loss to a veritable minimum without these mechanical disadvantages and an ancillary object of moment is the adaptation of the current collector to the relatively small available space in machines of the homopolar type, especially those of relatively small size, since these machines are not built of large capacity as a rule. Conversely, the current collector of my invention is devised with a view to permitting such machines to be constructed of smaller compass.

These objects and aims we reach first by providing brush contact with a given rotor of a collector throughout substantially the entire 360° of such rotor; secondly, by subdividing brush mass into relatively small portions so small that the inertia of each is small, that the individual contact area is small and therefore may be perfectly maintained, and that the greatest brush pressure per unit is small irrespective of the degree of pressure per unit brush. Thirdly, we individually yieldingly press these brushes to the rotor part under a relatively constant gross pressure per unit brush, for with so great division of the brush mass individual pressure adjustment becomes of secondary importance. Fourthly, we commonly mount all of these brushes in the fixed current conductor through which all current must pass independently of their support. In other words, we constitute the fixed conductor itself the brush support.

The details of construction will be apparent from the accompanying drawings in which—

Figure 1 is a transverse cross section of the current collector.

Figure 2 is an axial cross section with parts broken away.

Figure 3 is an enlarged detail radial cross section of a single brush unit.

Figure 4 is an enlarged detail cross section of the same unit.

Fig. 5 is a detail view of the retaining element per se.

The rotor of a homopolar machine is designated 10, the surrounding casing 11, and one of the field poles 12 in Figs. 1 and 2. So far as the machine per se enters into the combination of my invention, the rotor 10 revolves on axis 13 and casing 11 is concentric therewith and interiorly machined at 14 to concentrically connect with the exterior surface 15′ of the rotor 10.

Seated within the surface 14 surrounding the rotor 10 is an annular conductor ring 15 which constitutes the fixed conductor through which flows all the current of the collector. It may be connected with a cable in any suitable manner. It may or may not be insulated from its seat 14 in accordance with the requirements of any particular case. It is of solid and massive form, preferably of wrought or cast copper. In its interior perimeter it is provided with a large number of tangentially extending slots 16 in the form of sockets closed outwardly and opening upon the inner perimeter of the ring. Preferably these slots are formed in interior projections 17.

Tangentially projecting from these slots is an annular series of spring and conductor leaves 18 and 19 of coextensive form. The uppermost member 18 is a spring of phosphor-bronze or steel. The lowermost leaves are not necessarily of resilient material but are primarily of highly conducting material such as phosphor-bronze or copper leaves. Intermediate their ends they are provided with a small loop 20 to insure against dimensional variations and for the greater general pliability or ease of flexure. These leaves are securely clamped on the inner sides of slots 16 by clamping blocks 21 of the area of the slots set hard against them by clamping screws 22 operable from the exterior of the ring. The heads of these members 22 are counter-sunk below the outer perimeter of the ring.

At the end of each leaf set 18—19 is mounted an individual brush 23. The brush is of trapezoidal cross section in the transverse radial plane. It is connected with the leaf sets 18—19 by its base. A sheet metal brush holder 24 effects the connection. The base 25 of this sheet is of plane form intimately contacting with the top of the brush 23. Its opposite margins 26 are reversely inwardly bent toward the main body 25 and constitute the holder at large of a cross section corresponding to the base portion of the trapezoidal section of the brush 23. The brush holder is of resilient material and its reversely bent margins 26 intimately engage the sides of the brush 23 and in turn, maintain the intimate connection of the base 25 with the base of the brush 23. The leaf sets 18 and 19 overlie the base 25 of the holder. Between the conducting leaves 19 and the spring leaf 18 is an aligning and retaining device 27 in the form of a block or sheet metal clip of conducting material, preferably phosphor-bronze, co-extensive with the base of the brush holder 25 and the ends of the leaves 18—19. At each of its axially opposite ends, it is provided with three ears, the two outside of which 28 are downwardly bent to electrically contact with and align and retain in place against axial displacement the brush 23 and the sides of the leaves 19. The third ears 29 are upwardly and inwardly bent to overlie, contact with and retain in position and alignment the spring leaf 18. The entire ensemble is bound together, brush holders 25, leaves 18, 19 and aligning and retaining device 27 by a unitary securing means 30 in the form of a machine screw and nut passed centrally through the flat area of the parts. The brush, however, is not so bound. Its base is recessed as at 31 to receive the head of the machine screw 30. Brush 23, therefore, is releasable at will from its intimate contact with the holder 25, 26, merely by springing it out of place. Yet when in place, all the parts are in most intimate contact with each other.

In effect, the brushes are dovetailed with the holders. The brushes themselves are a compound of copper carbon with a high proportion of copper.

That this construction attains fully the object sought should be apparent. But a few brushes are illustrated. It is intended that there be many more, the number and general proportions being chosen for purposes of illustration. The greater the number the more fully are the advantages of my invention realized. Each brush is of very small mass. It has relatively small brush contact with the rotor 10. Yet each has a relatively much larger and much more intimate contact with brush holder and conducting leaves 18, 19 by reason of the nature of the junction with the holder 25, 26 and the dovetailed engagement with the base of the trapezoidal section. The co-extension clamped plate-like engagement of the overlying brush holder, leaves and aligning device provides an unexcelled junction at this point. The pressures of the springs 18 are nicely adjustable with respect to the pressure required between brush and rotor. The plate-like clamping between the opposite ends of the leaves, the plate 21 and the ring 15 in the slots 16 is equally efficient as against ohmic loss. The manifold divisions of the total current volume into these many small parts without decreasing the contact areas at the junctions between brush and leaves and ring keeps the ohmic loss down to a minimum. Yet the entire device is one of extremely simple construction. Brushes, leaves and ring lie in the same transverse plane and are at the same time radially of very small depth. The total space occupied is a veritable minimum.

All modifications of our invention falling within its generic spirit we claim as our invention to the same extent as the construction and method which we describe.

What we claim as new and useful and desire to protect by Letters Patent is:—

1. A current collector comprising a brush holder, a leaf conductor overlapping the base of the holder, an aligning device for aligning the holder and the leaf conductor, and a unitary means securing the parts together.

2. A current collector comprising a brush holder, a leaf conductor overlapping the base of the holder, a brush in the holder, and an aligning device for aligning the leaf conductor and the holder, said aligning device having a retaining connection with the brush.

3. A current collector comprising a brush, a leaf conductor leading therefrom, and a combined brush aligning and retaining device interlocking the brush and the portion of the leaf conductor adjacent the brush against relative movement.

4. A current collector comprising an annular brush carrying conducting ring having tangential slots in the interior perimeter of said ring, and brushes projecting interiorly in the plane of said ring and carried by conductor supports anchored in said slots.

5. In a dynamo electric machine a current collector comprising an annular brush carrying conductor ring exteriorly seated in the outer casing of the machine and having tangentially extending slots in its inner perimeter, and brushes projecting interiorly in the plane of the ring and carried by leaf springs anchored in said slots.

In testimony whereof we hereunto affix our signatures.

EARL J. W. RAGSDALE.
JOHN C. WHITESELL, Jr.